United States Patent
Kohler

[11] 3,854,137
[45] Dec. 10, 1974

[54] DIRECTION DETERMINING METHOD

[75] Inventor: Karl Kohler, Heimerdingen, Germany

[73] Assignee: International Standard Electric Corporation, New York, N.Y.

[22] Filed: Jan. 26, 1972

[21] Appl. No.: 220,982

[30] Foreign Application Priority Data
Jan. 26, 1971 Germany............................ 2103580

[52] U.S. Cl. ...... 343/106 D, 343/108 R, 343/113 R, 343/113 DE
[51] Int. Cl............................................... G01s 1/44
[58] Field of Search........ 343/106 R, 106 D, 108 R, 343/108 M

[56] References Cited
UNITED STATES PATENTS
3,634,862   1/1972   Hiscox et al. .................... 343/108 R
3,704,465   11/1972   Masak et al..................... 343/108 M

*Primary Examiner*—Maynard R. Wilbur
*Assistant Examiner*—T. M. Blum
*Attorney, Agent, or Firm*—William T. O'Neil

[57] ABSTRACT

A direction-determining system, particularly for measuring the elevation by determining the transit-time differences of electro-magnetic waves which are successively sent out by a reference radiator and a plurality ($n$) of radiators arranged along a straight line. From the n values for the transit-time differences, the azimuth ($\phi$) is calculated by means of a computer in two different ways: the first serves to determine an elevation of less than 3°, and the second serves to determine an elevation of more than 3°.

5 Claims, 12 Drawing Figures

DIRECTION DETERMINING METHOD

CROSS-REFERENCES TO RELATED APPLICATIONS

This application is filed under the provisions of 35 U.S.C. 119 with claim for the benefit of the filing of an application covering the same invention filed Jan. 26, 1971, Ser. No. 21 03 580 in Germany.

BACKGROUND OF THE INVENTION

1. Field of the Invention

The present invention relates generally to direction finding systems and more particularly to methods of determining direction in a moving receiving station by measuring the phase differences of electromagnetic waves transmitted from different points.

2. Description of the Prior Art

Known is the so-called Erika method, in which the azimuth of a receiver is determined, via a phase measurement, from the transittime difference between two signals radiated at different points. Also known is a sector radio beacon (German Printed application No. 1,591,610), which is identified in the art by name "SETAC-A." In that method and system, signals are radiated from three different radiators. By determining the phase differences between the signals radiated by the main radiator and those radiated by a side radiator spaced a large distance from the main radiators, an accurate measurement of azimuth is achieved. The result of the measurement is basically ambiguous, however. The ambiguity is resolved by means of a signal radiated by a second side radiator spaced a short distance from the main radiator. The separation and isolation of the two simultaneous measurements involved is made possible through use of different frequencies.

The above methods may also be used for direction finding when the direction of an incident wave is to be determined. Such apparatus is commonly known as 'interferometer.'

A common feature of all aforementioned methods is that, for measuring the azimuth, the radiators are arranged in a single plane parallel to ground. If, however, the radiators are arranged along a vertical straight line in order to be able to measure elevation, large phase errors are produced, since not only the beam transmitted directly from the antenna is extant at the receiver, but also a second, ground-reflected beam reaches the receiver. The superposition of the two beams results in a phase error, which is commonly called "ground error" or "ground reflection error." The result is that the transit-time from the transmitting antenna to the receiver is erroneous. A transit-time error is also present when radiators are arranged in one plane parallel to ground (for azimuth measurement), but it is the same for all radiators. During the subtractions — transit-time differences are measured and accordingly, those errors cancel each other.

If radiators are arranged at different heights above ground, different false transit times occur from each. The resulting phase errors no longer cancel each other during the processing subtractions. This results in a considerable error in the elevation measurement case, unless accounted for by the use of special methods of evaluating the received signals such as disclosed in German Pat. No. 1,249,361.

It should also be noted that it is known to sequentially connect the radiators of a line arrangement to a transmitter with a view toward simulating the mechanical movement of a radiator to generate an artificial Doppler effect. Due to that Doppler effect, the movement causes a frequency shift, the dependence of which on direction is used for navigation. These are the so-called Doppler systems (e.g., German Pat. No. 1,085,929 and German Pat. No. 918,271).

The above-described methods, in which transit-time measurements are made are not free of relatively large ground errors. The manner in which a significant improvement is effected by the present invention will be evident as this specification proceeds.

SUMMARY OF THE INVENTION

The present invention has for its general object the improvement of such systems and measurement methods, particularly the so-called SETAC method, so that ground error is smaller than in the known methods, without the requirement for larger aperture or beaming of the radiators.

A switching transmitting antenna system consisting of a plurality of radiators is employed. The transmitting antenna system may appropriately consist of a linear array of uniformly spaced individual radiators.

For elevation measurement purposes, the linear antenna array is oriented substantially vertically. For azimuth, the array is horizontal. A fixed reference radiator provides a constant phase RF signal against which the airborne equipment is adapted to make phase measurements as hereinafter described.

To attain this, two approaches are provided: The first method is characterized in that the respective phase differences $(\beta_1 \ldots \beta_\nu \ldots \beta_n)$ between the waves successively sent out by a fixed reference radiator (height $h_o$) and each of an even number ($n$) of radiators (heights $h_\nu$) which are spaced incremental distances, increasing respectively by the same path (d), from the reference radiator and preferably arranged along a straight line (linear antenna) are measured. From the measured values for these phase differences $(\beta_1 \ldots \beta_\nu \ldots \beta_n)$ the direction $(\psi')$ is determined according to the relation $$\sin \psi' = (2P/[\pi n(2d/\lambda)])$$

where $$P = \sum_{\nu=1}^{\nu=n/2} (\beta_{n-\nu+1} - \beta_\nu),$$

and where $n =$ (even) number of the radiators, $\nu =$ serial (ordinal) number of the radiator, $d =$ spacing between two adjacent radiators, and $\lambda =$ wavelength of the transmitted waves.

The second method is characterized in that the respective phase differences $(\beta_1 \ldots \beta_\nu \ldots \beta_n)$ between the waves successively sent out by a fixed reference radiator (height $h_o$) and each of an even number ($n$) of radiator (height $h_\nu$) which are spaced incremental distances (preferably in a linear array) are measured, and from the measured values for those phase differences a new sequence of numbers $(\psi''_1 \ldots \psi''_\nu \ldots \psi''_n)$ representing the corresponding direction angles measured is formed according to the relation $\psi''_\nu =$ arc sin $\beta_\nu / 2\pi\nu(d/\lambda)$.

From the values thus obtained for the various azimuths ($\psi''_\nu$), the maximum value is determined and indicated as direction $\psi'$. In this arrangement and method, the individual radiator to receiving station distances increase by the same path increment along the array.

In the arrangements and methods according to the invention, unlike in the aforementioned Doppler systems, the radiators of the line antenna are switched sequentially, so that the radiation patterns of the radiators are available in the receiver, separated with respect to time, only as long as is necessary for the measurement of the transit-time differences (i.e., time-division multiplex is employed). Thus, switching is effected only in order to be able to separate the individual measurements from each other. This separation could also be brought about by different frequencies, such as in the SETAC-A system (frequency-division multiplex).

The invention will now be explained with reference to embodiments relating to the elevation measurements and with the aid of the accompanying drawings.

BRIEF DESCRIPTION OF THE DRAWINGS

FIG. 1b graphically depicts the result of an elevation measurement obtained with the antenna of FIG. 1a.

FIG. 3b shows the ground error pattern corresponding to FIG. 3a.

FIG. 4b shows the ground error pattern corresponding to FIG. 4a.

DESCRIPTION OF THE PREFERRED EMBODIMENT

Figures 1A, 1C, 5:
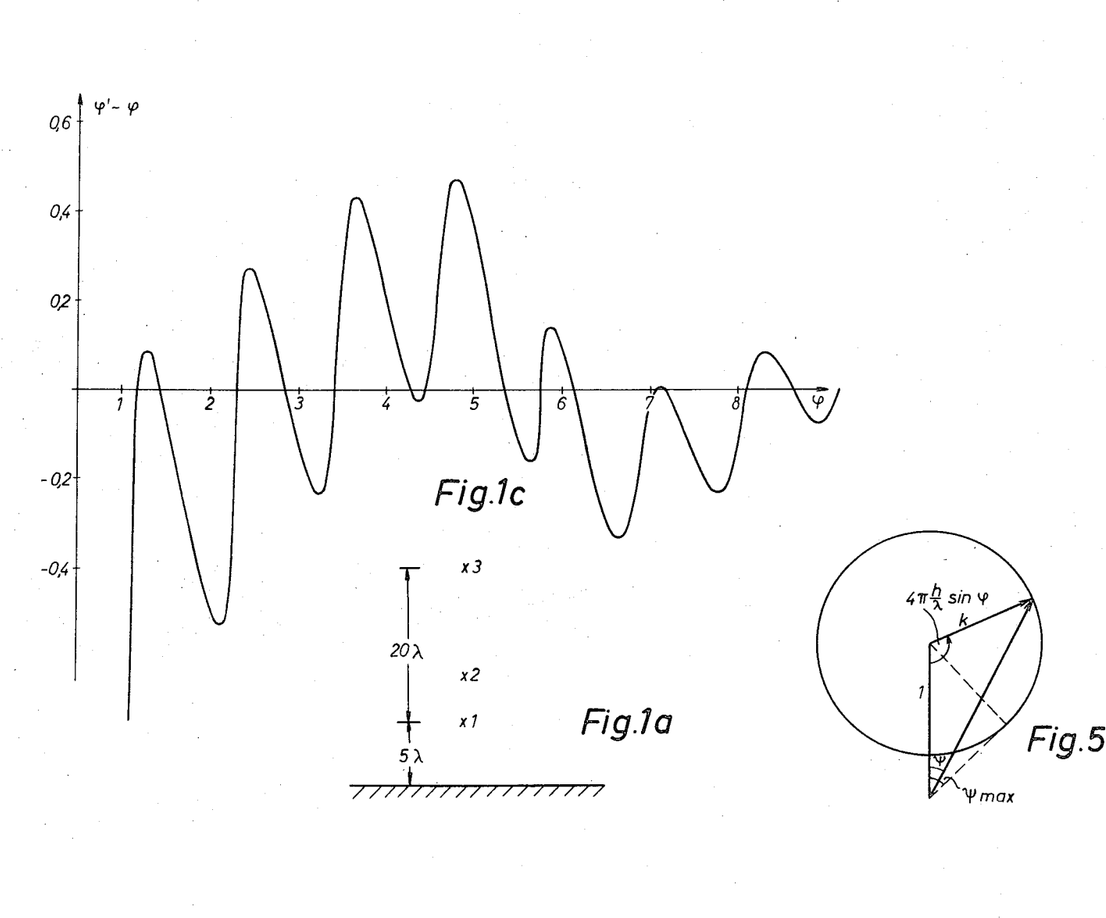
FIG. 1a illustrates schematically, a known antenna for a so-called SETAC-A system.
FIG. 1c shows the ground error pattern corresponding to the measurement illustrated in FIG. 1b.
FIG. 5 is a vector diagram showing the superposition of the ground-reflected radiation on the direct radiation.

FIG. 1a represents a 3-radiator linear antenna array with base length $20\lambda$, used in the known SETAC-A system, which is set up vertically. The transit-time difference between the radiator pair 1 and 3 provides the measured elevation $\psi'$, while the radiator pair 1 and 2 only resolves the ambiguity of the measurement. The 3 radiators comprise multisection radiator groups within the overall linear array.

Figure 1B:
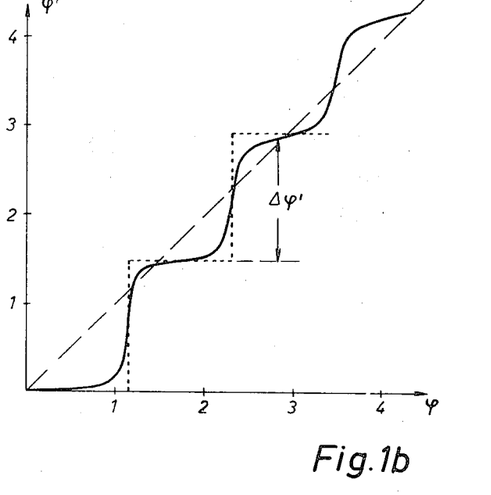

In FIG. 1b, the result of the elevation measurement (measured and indicated value $\psi'$) is plotted versus the real elevation $\psi$. It is assumed that the free-space radiation patterns of the radiators are uniform and symmetrical with respect to a plane parallel to ground. Consequently, the radiation in the direction of the reflection point on the ground is equal in magnitude to the radiation directly to the airborne receiving station. Also assumed is vertically polarized radiation, so that a power loss occurs during reflection. The calculation is based on medium ground with $\epsilon_r = 15$ ($\epsilon_r =$ relative permittivity), and an operating frequency is 1 GHz.

The curve of FIG. 1b will be seen to be of the general staircase shape. If the ground did not reflect, i.e., in the ideal case, the indication $\psi'$ would be equal to the real value $\psi$, and the curve would be the diagonal drawn as a broken line. The other extreme case occurs if the reflection from the ground is 100 percent. In that case, a more pronounced staircase curve is obtained, as shown by the dotted line. Since, in reality, the reflection from the ground ranges between 0 and 100 percent, an intermediate curve between the diagonal and the staircase curve is obtained in practice.

The influence of the ground could be prevented by using highly pre-focused radiator systems with large aperture consisting of several individual radiators. That approach results in large dimensions however.

The step height $\Delta\psi'$ of the staircase curve of FIG. 1b is calculated from the equation $\sin \Delta\psi' = 1/2h/\lambda$, the aperture being given by the spacing h between the radiators 1 and 3. If $h = 20\lambda$, then $\Delta\psi' = 1.45°$. If a step height of $\Delta\psi' = 0.1°$ were desired, the length of the aperture would have to be $h = 290\lambda$.

The invention, which will now be described, pursues a different and more practical course.

As already mentioned, the novel methods of the invention can operate by either time-division multiplex or frequency-division multiplex. In the embodiments described however, the methods will be considered for time-division multiplex operation only.

Figure 2A:
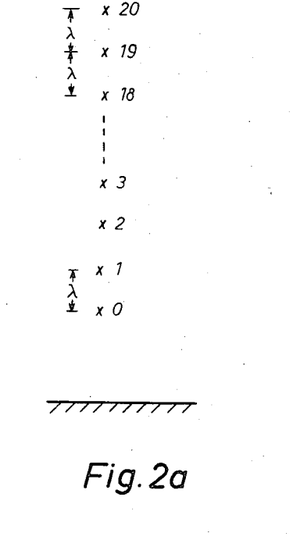
FIG. 2a shows the antenna configuration for carrying out measurements according to the invention methods.

In FIG. 2a, n identical radiators with the numbers 1, 2, 3 .... n are arranged equidistantly along a vertical straight line. In that example, $n = 20$ radiators, and the mutual spacing is $\lambda$. Also provided is a reference antenna. The reference antenna is added to the line antenna on the bottom as number 0. In the fullbase method (using all radiators of the linear array antenna), it may be located elsewhere.

The transmitter feeding the antenna produces pulse pairs having the carrier frequency $f_o$. With each pulse pair, $f_o$ is coherent. The first pulses of the pulse pairs are radiated successively by the radiators 1 to n, while all second pulses are radiated by the reference antenna. The lines from the transmitter via the distributor to all radiators are of equal length and have the same loss, so that the radiators are excited cophasally with pulses of equal amplitude. After each radiator of the line antenna has been fed, there is a jump back to the beginning. Through additional synchronizing signals, the receiver is informed as to when the backward jump (reset) takes place.

Figure 2B:
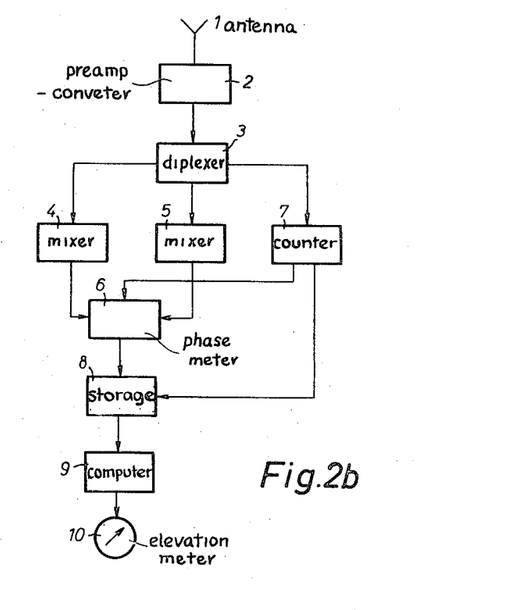
FIG. 2b illustrates a receiver in block form for carrying out the airborne part of the measurement according to the invention.

FIG. 2b shows a block diagram of the airborne receiver responsive to the signals radiated by the antenna of FIG. 2a. The signals received by means of an antenna 1 are preamplified in a unit 2 and frequency-converted in the usual manner. In a diplexer 3, the pulse pairs are separated. The first pulses of each pulse pair reach a mixer unit 4 containing an amplifier, a frequency converter, and a delay; the second pulses are applied to a mixer unit 5, which contains an amplifier and a frequency converter. Furthermore, in the diplexer 3, the synchronizing signals are singled out; they reset a counter 7 to the value 0. Each pulse pair passing through the diplexer 3 advances the counter 7 by one digit. The count indicates the number $\nu$ of the radiator in which the first pulse of the last arrived pulse pair originated. Thus, in the units 4 and 5, the pulses are amplified, frequency-converted, and, by the delay line in the unit 4, made coincident, so that their phase difference, which, as is generally known, corresponds to the transittime difference of signals, can be measured in a phase meter 6. The manner in which the measurement of the transit-time difference, i.e., the phase measurement, is carried out, or the question as to which of the well-known methods (time-difference measurement, start-stop method, counting of zero passages of the signals, etc.) should be used, is of secondary importance to the invention. After each complete scan of the line antenna, n measured values of the phase differences are present in the receiver, which measured values form a sequence of numbers $\beta_1 \ldots \beta_\nu \ldots \beta_n$. As a rule, the phase meter 6 is capable of measuring phase values in the range $0 \leq \beta \leq 2\pi$ only. If the phase exceeds the value $2\pi$, the measurement of the phase meter 6 is short by the value $2\pi$. Then, in the sequence of numbers, a jump of $2\pi$ is obtained. It is therefore necessary to check, by means of a test circuit, the sequence of numbers $\beta_\nu$ for jumps and, when jumps occur, to compensate for them by adding $2\pi$ (or a multiple thereof). The counter 7 also operates as a step-by-step switching device, which controls the storing of the measured values $\beta_1 \ldots \beta_\nu \ldots \beta_n$ in a storage 8. $n$ is an even number. In a computer 9, a numerical value P is formed out of the sequence of numbers $\beta_1 \ldots \beta_n$:

$$P = \sum_{\nu=n/2+1}^{\nu=n} \beta_\nu - \sum_{\nu=11}^{\nu=n/2} \beta_\nu = \sum_{\nu=1}^{n/2} (\beta_{n-\nu+1} - \beta_\nu).$$

From this numerical value, the elevation $\psi'$ is then determined by the equation $$\sin \psi' = 2P/\pi n \ (2\ d/\lambda)$$

and indicated. In this equation, $d$ is the mutual spacing between the radiators of the line antenna, and $\lambda$ is the wavelength.

Figure 3A:
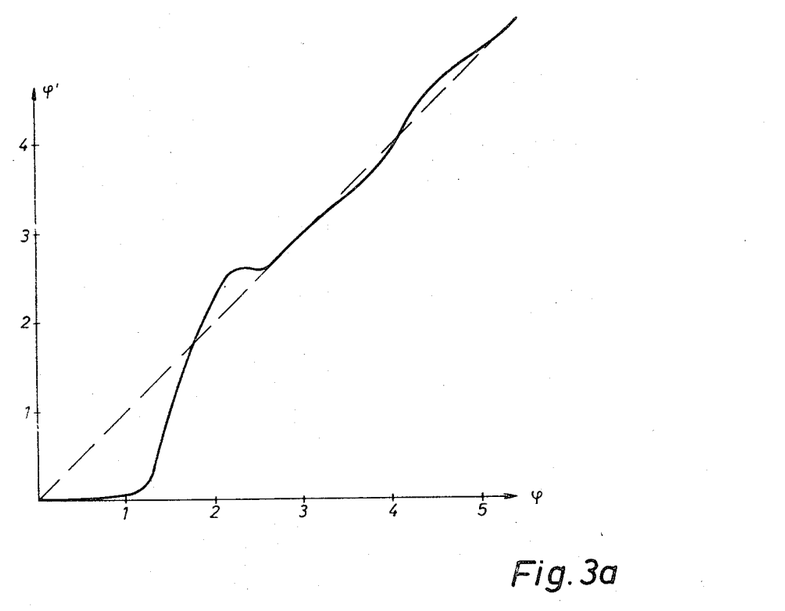
FIG. 3a shows the result of an elevation measurement by a first method (full-base method) in accordance with the invention.
Figure 3B:
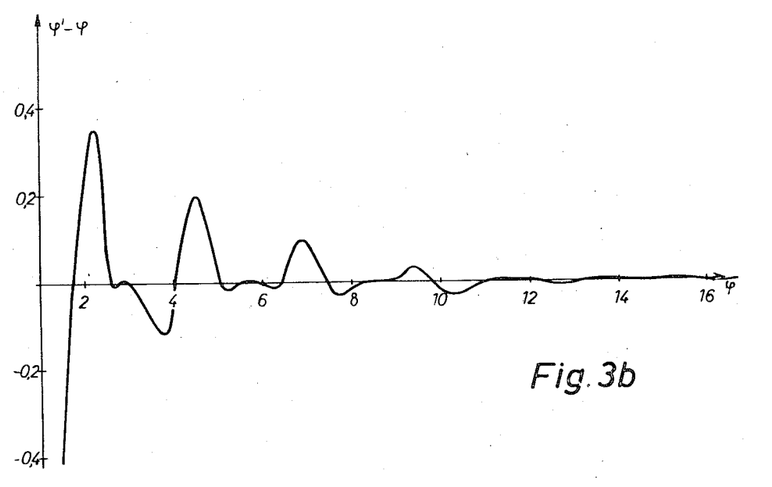

In FIG. 2a, $d = \lambda$ and $n=20$; FIG. 3a shows the measurement results for this example. With the base length being the same, the full-base method provides a considerable improvement over the well-known base-rim method of FIG. 1c, as a comparison of FIG. 3b to FIG. 1c shows.

This description of the first method will now be followed by a description of a preferred embodiment for practicing the first method.

An improvement upon the full-base method is achieved by weighting the measured values. The computer 9 of the receiver performs this weighting and multiples the measured values stored in the storages 8 by different factors, the measured values stemming from the central radiators getting a greater weight than those stemming from the outer radiators. It is assumed that the factors for weighting are a $\nu$. In this method, the computer forms the numerical value $$P_G = \sum_{\nu=1}^{n/2} a_\nu (\beta_{n-\nu+1} - \beta_\nu)$$

and determines the elevation $\psi'$ from the relation $$\sin \Psi' = \frac{P_G}{2\pi \frac{d}{\lambda} \sum_{\nu=1}^{n/2} [(2\nu - 1) a\nu]}.$$

Figure 4A:
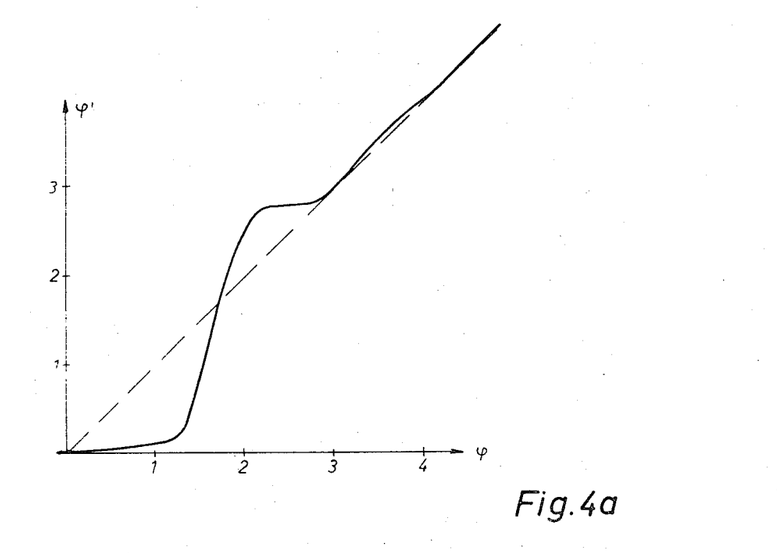
FIG. 4a shows the result of an elevation measurement by a preferred embodiment of the first method (weighted full-base method).
Figure 4B:
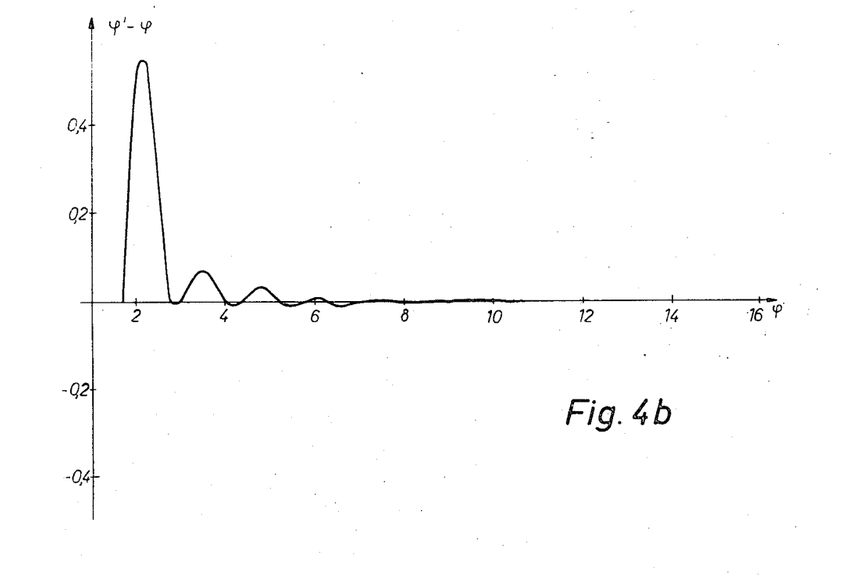

If the $a\gamma$ are calculated according to the relation $a\gamma = [1-0.03 \ (n/2 + 1 - \gamma)] \sin (\pi/n) (2\gamma - 1)$ and fed as constants into the computer 9 of the receiver, the measurement results illustrated in FIG. 4a are obtained with the ground error of FIG. 4b.

A comparison of FIG. 4b to FIG. 3b corroborates that, through the weighting, the ground errors have been further reduced.

To summarize the system underlying the first method and its preferred embodiment: On a base of predetermined length, $n$ like radiators ($n$ = even number) and a reference radiator are arranged, preferably equidistantly. In the receiver, the transit-time differences between the $n$ radiators and the reference radiator are measured. From the $n$ numerical values $\beta_\nu$ received in the receiver for each full scan of the line antenna, a numerical value $P$ or $P_G$ is determined by uniform weighting (full-base method) or by non-uniform weighting (weighted full-base method), with the aid of which the numerical value of the elevation is determined.

In the following, the second method will be explained. It will be shown how the elevation of the receiver can be obtained, in approximately error-free manner, from the phase differences stored in the storage 8 of the receiver.

In this second method, the ground antenna, its connection to the transmitter, and the main parts of the receiver are essentially the same as in the first method. Therefore, they will not be explained again.

FIG. 5 shows the results of the superposition of the ground-reflected radiation (vector $k$ = reflection factor) upon the direct radiation (fixed vector 1). The resulting radiation is shifted in phase with respect to the direct radiation by the angle $\psi$. In the following, the receiver is assumed to be stationary ($\phi$ = constant). Then, with homogeneous ground, $k$ is constant, too. Instead of the successive connection of the radiators, a steady movement of an arbitrary radiator from the ground ($h = 0$) vertically upwards is assumed.

For $h = 0$, the two vectors are in phase opposition, and the phase error is $\psi = 0$. If the distance $h$ of the radiator from the ground is increased, $\psi$ first rises and then assumes a maximum for $\cos (2\pi h_o/\lambda \sin \phi) = k \cdot (\pi$ = elevation, $\lambda$ = wavelength).

At this point, the reference radiator is installed. Now, the arbitrary radiator is moved further upwards. The phase error $\psi$ first decreases again and disappears when $4\pi h/\lambda \sin\phi = \pi$. If $h$ is further increased, the error becomes negative, reaches a negative maximum, and becomes 0 again when $4\pi h/\lambda \sin\phi = 2\pi$. Further increase causes $\psi$ to become positive again, and the positive maximum is reached for the condition:

$2\pi\ h/80\ \sin\phi = 2\pi + \text{arc cos } k$.

In the receiver, just as in the full-base method, the difference $\beta_\nu$ between the phases of the respective connected antenna and the reference antenna is formed. This results in an error $\Delta\beta_\nu = \psi(h_\nu) - \psi_{max}$.

As explained above, in each case $\Delta\beta_\nu = \psi(h_\nu) - \psi_{max} \leq 0$. If, in the receiver, a calculation is performed from the measured transit-time differences in accordance with the equation $\sin\rho''_\nu$ $$= \frac{\beta}{2\pi\frac{h_\nu - h_o}{\lambda}} = \sin\varphi + \frac{\Delta\beta_\nu}{2\pi\frac{h_\nu - h_\nu}{\lambda}},$$

$n$ values are obtained for the angle $\rho''$.

In this equation, $h_\nu$ = respective height of the radiators above ground, $h_o$ = height of the reference radiator above ground, $\beta_\nu$ = phase difference between the signals received from the radiator with the height $h_\nu$ and those received from the reference radiator with the height $h_o$, and $\lambda$ = wavelength of the transmitted signals.

The angle $\psi''$ is always too small, except where it reaches its maximum; there, it is exact. Therefore, the maximum is determined and indicated.

Thus, the individual steps of this second method are the following:

a. The reference antenna is mounted at a height $h_o$ above ground in such a manner that $\cos(2\pi h_o/\lambda \sin\phi) = k$ is satisfied. If, for example, $h_o = 1.5\lambda$, then, at medium ground ($\epsilon_r = 15$), the $\psi_{max}$ will be: exactly at the elevation $\phi = 2.3°$. The maximum is very wide ($-0.8°$; $+1.2°$).

b. A line antenna is switched, and the sequence of numbers $\beta_1 \ldots \beta_\nu \ldots \beta_n$ is determined as described.

c. From the $\beta_\nu$, a sequence of numbers is calculated according to the equation $\phi''_\nu = \text{arc sin } \beta_\nu /2\pi\nu d/\lambda$ and stored; $d$ being the spacing between the radiators in the line antenna.

d. The maximum value of the sequence of numbers $\phi''$ is determined and indicated as elevation $\phi'$.

e. If the sequence of numbers $\phi''$ has several maxima, the maximum with the highest number $\nu$ is indicated. This second method described is called "selection method".

While, in the full-base methods, all measurements with possible weighting are used to determine the elevation (in the 3-radiator system, such as in the so-called SETAC-A), only one measurement is used in the selection method, but selectively it is that one out of the $n$ individual measurements which contains no ground error.

Figure 6A:
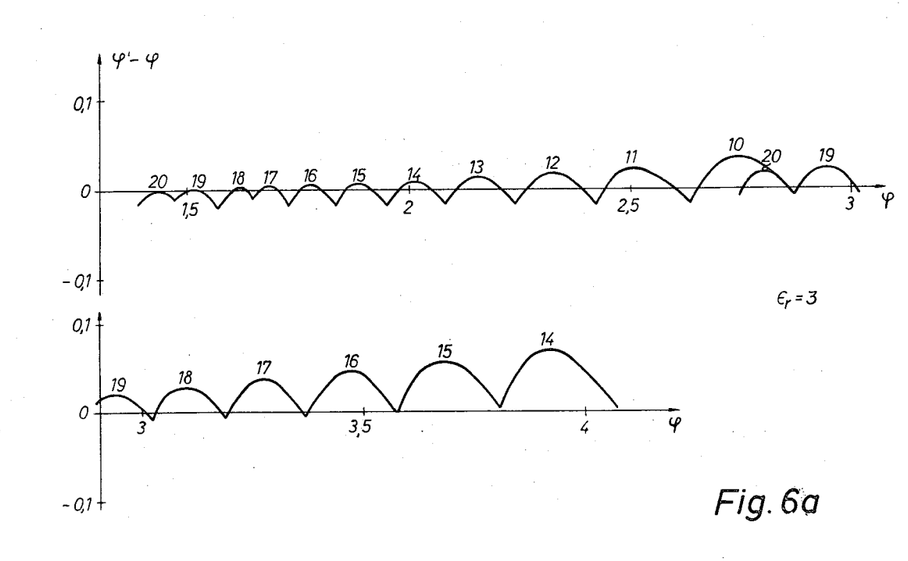
FIG. 6a shows the ground error pattern of the second method (selection method) when the ground is dry ($\epsilon_r = 3$).
Figure 6B:
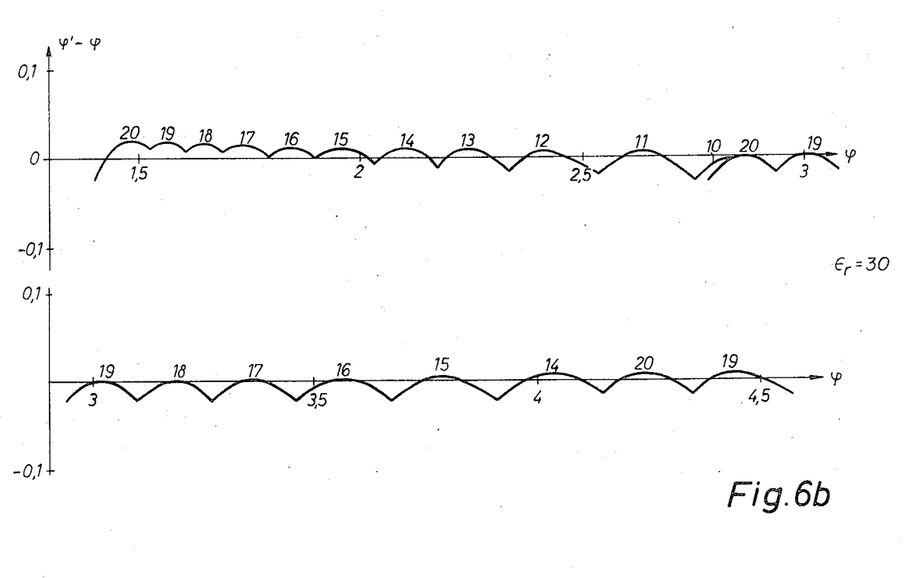
FIG. 6b shows the ground error pattern of the second method (selection method) when the ground is wet ($\epsilon_r = 30$).

In FIGS. 6a and 6b, the ground error for the selection method is plotted. Assumed is a line antenna with 20+1 radiators spaced $d = \lambda$ apart, with dry ($\epsilon_r = 3$) and wet ($\epsilon_r = 30$) ground at an operating frequency of 1 GHz.

While, in the full-base method, the distance of the reference radiator from the ground may be chosen at will, in the selection method it is fixed by the elevation range (in the example $n_o = 1.5\lambda$).

While the full-base method, with the base $20\lambda$, is suitable from high elevations down to 2.5°, the selection method is very well suited for the range from 4° down to 1.4°. It is therefore appropriate to design an airborne receiver for both methods and to indicate and use, for an elevation $\phi < 3°$, the result of the selection method; and for $\phi$ 3°, the result of the selection method, and for $\phi \geq 3°$, the result of the full-base method as measured elevation.

By increasing the base by the factor $\bar{K}$ to K. $20\lambda$, the lower limits of measurement can be reduced to $2.5°/K$ for the full-base method, and to $1.4°/K$ for the selection method. For a lower limit of measurement of 1° elevation, a base of at least 28 $\lambda$ is necessary.

Various modifications falling within the spirit of the invention will suggest themselves to those skilled in this art. Accordingly, it is not intended that the invention be limited by the specification and drawings, these being only illustrative and typical.

What is claimed is:

1. A method of determining direction from a moving receiving station with respect to a ground-based Doppler type radio navigation station, said ground-based station having a reference antenna and a commutated linear array, successive radiators of which are spaced by a linearly increasing distance from said reference antenna comprising the steps of:

measuring at said receiving station, the respective phase difference between the waves successively transmitted by said reference antenna and each of said array radiators, the results of said measurement producing a series of phase values $\beta_1 \ldots \beta_\nu \ldots \beta_n$;

and computing a value representative of said direction $\phi'$ according to the relation $\sin\phi'' = 2P/[\pi n(2d/\lambda)]$, where $$P = \sum_{\nu=1}^{\nu=n/2}(\beta_{n-\nu+1} - \beta_\nu),$$

and where $n$ = an even number of radiators, $\nu$ = the serial number of the radiator, $d$ = spacing between adjacent radiators, and $\lambda$ = the transmitted wavelength.

2. A method according to claim 1 in which the angle to be determined is further defined as the elevation angle of said receiving station with respect to said ground station, said array being generally vertically oriented.

3. A method according to claim 1 in which the angle to be determined is further defined as the azimuth angle of said receiving station with respect to said ground station, said array being generally horizontally oriented.

4. A method according to claim 2 comprising the additional step of weighting said measured phase values prior to said computing step, said weighting being effected as a factor $a_\nu$ of corresponding radiator height $h_\nu$ according to the relationship $a_\nu = [1-0.03 (n/2 + 1 - \nu)] \sin \pi/n (2\nu - 1)$.

5. A method of determining direction from a moving receiving station with respect to a ground-based Doppler type radio navigation station, said groundbased station having a reference antenna and a commutated linear array, successive radiators of which are spaced by a linearly increasing distance from said reference antenna comprising the steps of:

measuring at said receiving station, the respective phase difference between the waves successively transmsitted by said reference antenna and each of said array radiators, the results of said measurement producing a series of phase values $\beta_1 \ldots \beta_\nu \ldots \beta_n$, the angle to be determined being further defined as the elevation angle of said receiving station with respect to said ground station, said array being generally vertically oriented, computing a value representative of said direction according to the relation $$\sin \varphi' = \frac{P_G}{2\pi \frac{d}{\lambda} \sum_{\nu=1}^{\nu=n/2} [(2\nu-1) A_\nu]}$$

where $$P_G = \sum_{\nu=1}^{\nu=n/2} A_\nu (\beta_{n-\nu+1} - \beta_\nu)$$

and where n= an even number of radiators, $\nu$ =serial number of the radiator, $d$ =spacing between adjacent radiators, and $\lambda$ = the transmitted wavelength, and weighting said measured phase values prior to said computing step, said weighting being effected as a factor $a_\nu$ of corresponding radiator height $h_\nu$ according to the relationship $a_\nu = [1-0.03(n/2+1-\nu)]\sin \pi n (2\nu-1)$.

* * * * *